United States Patent
Creamer et al.

(10) Patent No.: US 7,200,400 B2
(45) Date of Patent: Apr. 3, 2007

(54) MOBILE TO 802.11 VOICE MULTI-NETWORK ROAMING UTILIZING SIP SIGNALING WITH SIP PROXY OR REDIRECT SERVER

(75) Inventors: Thomas E. Creamer, Boca Raton, FL (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 10/736,147

(22) Filed: Dec. 15, 2003

(65) Prior Publication Data

US 2005/0130657 A1    Jun. 16, 2005

(51) Int. Cl.
*H04Q 7/20* (2006.01)

(52) U.S. Cl. .................... 455/437; 455/439
(58) Field of Classification Search ........ 455/436–443, 455/445
See application file for complete search history.

(56) References Cited

U.S. PATENT DOCUMENTS

| | | | |
|---|---|---|---|
| 6,374,108 B1 | 4/2002 | Jakobsen et al. | |
| 6,493,558 B1 | 12/2002 | Bernhart et al. | |
| 6,763,236 B2* | 7/2004 | Siren | 455/450 |
| 6,889,045 B2* | 5/2005 | Pan et al. | 455/436 |
| 6,931,249 B2* | 8/2005 | Fors et al. | 455/436 |
| 6,973,313 B1* | 12/2005 | Sebastian | 455/445 |
| 6,993,335 B2* | 1/2006 | Natarajan et al. | 455/437 |
| 2002/0147008 A1* | 10/2002 | Kallio | 455/426 |
| 2003/0092444 A1* | 5/2003 | Sengodan et al. | 455/436 |
| 2003/0114158 A1* | 6/2003 | Soderbacka et al. | 455/436 |
| 2004/0087307 A1* | 5/2004 | Ibe et al. | 455/436 |
| 2004/0092265 A1* | 5/2004 | Chitrapu et al. | 455/436 |
| 2004/0203791 A1* | 10/2004 | Pan et al. | 455/442 |
| 2004/0248615 A1* | 12/2004 | Purkayastha et al. | 455/552.1 |

FOREIGN PATENT DOCUMENTS

| | | |
|---|---|---|
| WO | WO 2001/06744 A1 | 1/2001 |
| WO | WO 2002/07461 | 1/2002 |
| WO | WO 2003/077484 A2 | 9/2003 |

* cited by examiner

*Primary Examiner*—Edward F. Urban
*Assistant Examiner*—Blane J. Jackson
(74) *Attorney, Agent, or Firm*—Akerman Senterfitt (57) ABSTRACT

A method of roaming between a mobile network and a wireless network can include receiving, over the wireless network, an invite from a user agent disposed within a mobile communications device. The mobile communications device can be engaged in a call over a voice channel in the mobile network. The method also can include selecting one of a plurality of gateways having an affinity with the user agent, wherein each gateway is configured as an interface between at least one mobile network and the wireless network. The call can be handed off from the mobile network so that at least a portion of the call is conducted over the wireless network using the selected gateway.

35 Claims, 3 Drawing Sheets

MOBILE TO 802.11 VOICE MULTI-NETWORK ROAMING UTILIZING SIP SIGNALING WITH SIP PROXY OR REDIRECT SERVER

BACKGROUND

1. Field of the Invention

The invention relates to the field of mobile communications and, more particularly, to the use of wireless networking in conjunction with mobile networks.

2. Description of the Related Art

Wireless networks are becoming increasingly prevalent with thousands of so called hotspots being deployed throughout the United States, Europe, and Asia. A hotspot refers to the coverage area surrounding a wireless access point within which a device can communicate wirelessly with the access point. The access point typically includes a wireless transceiver and is connected to a packet-switched communications network such as the Internet. As such, the access point provides network connectivity to those devices capable of establishing a wireless communications link with the access point. Mobile users can roam between multiple hot spots while maintaining connectivity with a communications network. Examples of hotspots or wireless networks can include those networks built around one of the 802.11 wireless communications protocols.

Presently, such wireless networks function independently of mobile communications networks. These wireless networks, particularly 802.11 wireless networks, often function purely as data networks. That is, typically voice communications are not carried over such networks. In consequence, the voice capability of mobile networks has yet to be integrated with 802.11 wireless networks.

SUMMARY OF THE INVENTION

The present invention provides a method, system, and apparatus for allowing a mobile device user to freely roam between a mobile network and a wireless network without dropping a call. More particularly, at least a portion of a mobile call, for example the leg of the call between the mobile network and the user or subscriber, can be handed off to a wireless network. In accordance with the inventive arrangements disclosed herein, a grouping of one or more gateways can serve as interfaces between wireless networks and mobile networks. Each gateway can be associated with a particular mobile network, and thus, have an affinity for particular mobile communications devices and/or subscribers. The present invention uses a Session Initiation Protocol server to select the proper gateway from a group of one or more gateways to be used in handing off the call from the mobile network to the wireless network.

One aspect of the present invention can include a method of roaming between a mobile network and a wireless network. The method can include receiving, over the wireless network, an invite from a user agent disposed within a mobile communications device, wherein the mobile communications device is engaged in a call over a voice channel in the mobile network. One of a plurality of gateways can be selected. As each gateway can serve as an interface between at least one mobile network and the wireless network, the selected gateway can have an affinity with the user agent. The call can be handed off from the mobile network so that at least a portion of the call is conducted over the wireless network using the selected gateway.

In one embodiment of the present invention, the handing off step can include routing the invite to the selected gateway. A streaming session can be set up between the gateway and the mobile communications device. Accordingly, the handing off step can include conducting at least a portion of the call over the streaming session.

In another embodiment of the present invention, the selecting step can include determining a network location of the selected gateway. The handing off step further can include sending a reply to the user agent via the wireless network. The reply can specify the network location of the selected gateway. In that case, the mobile communications device can send an invite to the selected gateway thereby initiating a streaming session between the gateway and the mobile communications device over which at least a portion of the call is conducted.

In yet another embodiment of the present invention, the wireless network can be configured according to at least one of the 802.11 communications protocols. The invite can be formatted using Session Initiation Protocol. The method further can include tearing down the voice channel in the mobile network.

Another aspect of the present invention can include a method of roaming between a mobile network and a wireless network within a mobile communications device. The method can include engaging in a call conducted over a voice channel in the mobile network and sending, over the wireless network, an invite to a Session Initiation Protocol server. The Session Initiation Protocol server can select a mobile-wireless network gateway having an affinity with the mobile communications device that sent the invite. The call can be handed off so that at least a portion of the call is conducted over the wireless network using the selected mobile-wireless network gateway.

In another embodiment, the sending step can include receiving a reply via the wireless network, wherein the reply specifies a network location of the selected mobile-wireless network gateway and sending an invite to the selected mobile-wireless network gateway. The selected mobile-wireless network gateway can initiate a streaming session with the mobile communications device over the wireless network such that at least a portion of the call is conducted over the streaming session.

In another embodiment of the present invention, the streaming session can be set up between the mobile-wireless gateway and the mobile communications device such that at least a portion of the call is conducted over the streaming session. Notably, the wireless network can be configured according to at least one of the 802.11 communications protocols. The method further can include tearing down the voice channel in the mobile network.

Yet another aspect of the present invention can include a system for roaming between a mobile network and a wireless network. The system can include a wireless network having an access point, one or more gateways, and a Session Initiation Protocol server. The wireless network can be configured to wirelessly communicate with devices and facilitate communications over a packet-switched network. Each of the gateways can be configured as an interface between the packet-switched network and at least one mobile network. The Session Initiation Protocol server can be configured to determine which one of the gateways has an affinity with a mobile communications device.

The system further can include one or more mobile networks having a mobile data base station configured to communicate with a mobile communications device over a mobile voice channel of the mobile network and a mobile switching center configured to route mobile calls and link the mobile data base station with one the gateways. The selected one of the gateways, as determined by the Session Initiation Protocol server, and the mobile switching center can work cooperatively to hand off calls between the mobile network and the wireless network.

In one embodiment of the present invention, the Session Initiation Protocol server can be a Session Initiation Protocol proxy server configured to determine affinities between the mobile communications device and gateways and route invites received over the wireless network from the mobile communications device to the gateway having an affinity with the mobile communications device. In another embodiment of the present invention, the Session Initiation Protocol server can be a Session Initiation Protocol redirect server configured to determine affinities between the mobile communications device and gateways. The Session Initiation Protocol redirect server can reply to an invite from the mobile communications device. The reply can specify a network location of the gateway having an affinity with the mobile communications device. Accordingly, the mobile communications device can send an invite over the wireless network to the gateway determined by the Session Initiation Protocol redirect server.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
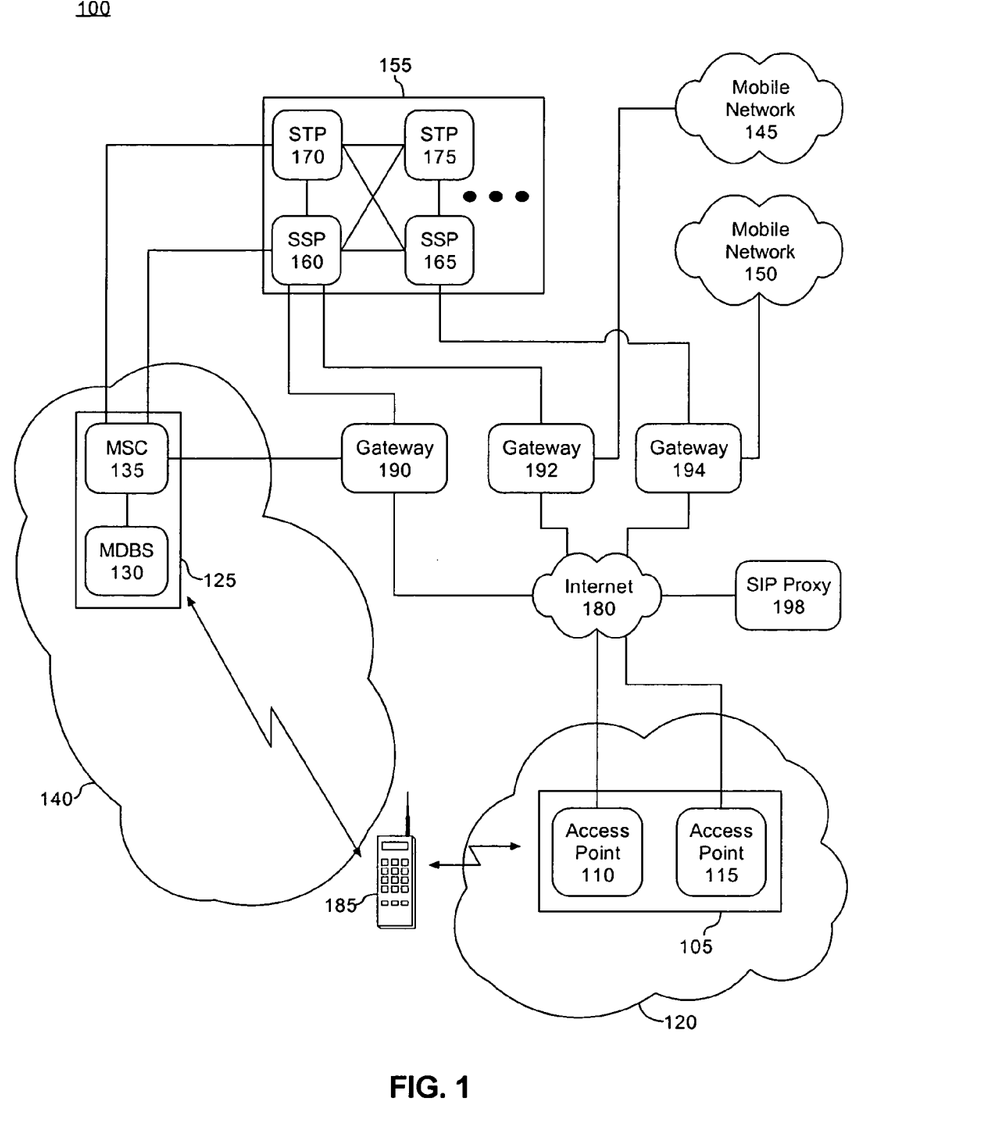
FIG. 1 is a schematic diagram illustrating a system for roaming between a mobile communications network and a wireless communications network in accordance with the inventive arrangements disclosed herein.

FIG. 1 is a schematic diagram illustrating a system 100 for roaming between one or more mobile communications networks (mobile networks) and a wireless communications network (wireless network) in accordance with the inventive arrangements disclosed herein. As shown, the system 100 can include one or more wireless networks 105, one or more mobile networks 125, 145, and 150, a Public Switched Telephone Network (PSTN) 155, and a packet-switched network such as the Internet 180.

The wireless network 105 can be any wireless network, of which TCP/IP over 802.11 is one example. As such, the wireless network 105 can include one or more access points 110 and 115. Access points 110 and 115 each can include a wireless transceiver for communicating with one or more mobile communication devices capable of communicating over an 802.11 wireless connection, for example mobile communications device 185. Each access point 110 and 115 further can include a wired connection to the Internet 180. Accordingly, each access point 110 and 115 is configured to serve as an interface between wireless or mobile communications devices communicating over an 802.11 communications protocol and packet-switched networks such as the Internet 180.

The mobile network 125 can be any of a variety of different wireless telephony networks including, but not limited to, a conventional cellular telephony network or a Personal Communications Service (PCS) network (hereafter referred to as a "mobile network"). The mobile network 125 can include one or more Mobile Data Base Stations (MDBS) 130 and a Mobile Switching Center (MSC) 135. As shown, the mobile network 125 can have a coverage area 140 within which mobile communications device 185 can wirelessly communicate with the MDBS 130 over a voice channel.

The MDBS 130 can send communications to and receive communications from wireless devices such as mobile communications device 185. For example, the MDBS 130 can include a tower (not shown) for wirelessly communicating with the mobile communications device 185. The tower can be communicatively linked with hardware and any necessary software within the MDBS 130 for converting data streams from the towers into valid signals and routing cellular (or mobile) switched data calls to the PSTN 155 and/or to another mobile destination. The MDBS 130 manages and accesses the radio interface of the mobile communications device 185 from the mobile network side. The MSC 135 includes hardware and any necessary software for connecting calls by switching the digital voice data packets from one network path to another. The MSC 135 effectively routes calls and also can provide additional information such as user registration, authentication, and location updating. The mobile networks 145 and 150 can be substantially similar to mobile network 125 as described herein.

System 100 further can include one or more gateways 190, 192, and 194. Each gateway 190–194 can include hardware and any necessary software to serve as an interface between one of the mobile networks, the Internet 180, and the PSTN 155. That is, each gateway serves as an interface between the Internet 180, the PSTN 155, and a particular mobile network, for example mobile network 125, 145, or 150. As shown, gateway 190 is associated with mobile network 125, gateway 192 is associated with mobile network 145, and gateway 194 is associated with mobile network 150. For example, each mobile network can be operated by a particular mobile carrier. Accordingly, each mobile network can be associated with a specific gateway, for instance one owned or operated by that carrier. As such, each mobile communications device, or subscriber, also is associated with, or subscribes to, a particular carrier, and therefore, mobile network. Thus, each mobile communications device can be said to have an affinity with a particular gateway.

While each of the gateways 190, 192, and/or 194 can serve as an interface to the Internet 180, each gateway also can be used as an interface to other packet-switched networks (not shown) such as Wide Area Networks, Local Area Networks, intranets, or the like. In any case, the gateways 190, 192, and 194 can format convert received data from each corresponding mobile network 125, 145, or 150, the PSTN 155, and/or the Internet 180 for transmission over a different one of the networks. In illustration, each gateway can receive data formatted for use over one of the mobile networks, data formatted for use over a circuit-switched network such as the PSTN 155, and packet-switched data for use over the Internet 180. With regard to the Internet 180 or other packet-switched networks, the gateways can send and receive Voice-Over Internet Protocol (VOIP) formatted data as can be used to conduct calls over such networks. The gateways can convert data from one format to another so that data can be freely exchanged between each of the mobile networks 125, 145, and 150, the PSTN 155, and the Internet 180.

It should be appreciated that while the gateways 190, 192, and 194 are depicted as being located separately from each corresponding mobile network, the gateways need not be so located. Rather, the gateways 190, 192, and/or 194 can be included as part of the PSTN 155 or the Internet 180. In one embodiment of the present invention, gateway 190 can be included within mobile network 125, gateway 192 within mobile network 145, and gateway 194 within mobile network 150.

The PSTN 155 can include Service Switching Points (SSP) 160 and 165, Signal Transfer Points (STP) 170 and 175, and one or more switching systems (not shown). The SSP's 160 and 165 are telephone switches interconnected by Switching System No. 7 (SS7) communication links. SSP's 160 and 165 perform call processing on calls that originate, tandem, or terminate at each respective site. The SSP's 160 and 165 can generate SS7 messages to transfer call-related information to other SSP's (not shown) or to query a Service Control Point (not shown) for routing instructions. The STP's 170 and 175 are switches that relay messages between network switches and databases. The STP's 170 and 175 can route SS7 messages to the correct outgoing signaling link based on SS7 message address fields.

A Session Initiation Protocol (SIP) server 198 can be communicatively linked with a packet-switched network such as the Internet 180. The SIP server 185 can be an application executing within a suitable information processing system having a communications link with the Internet 180. SIP is a standard protocol for initiating interactive user sessions that involve multimedia elements such as video, voice, chat, gaming, and virtual reality. SIP works in the Application layer of the Open Systems Interconnection (OSI) communications model to establish, modify, and terminate multimedia sessions or Internet telephony calls. The protocol also can be used to invite participants to unicast or multicast sessions that do not necessarily involve the initiator. Because SIP supports name mapping and redirection services, SIP allows users to initiate and receive communications and services from any location, and for networks to identify the users wherever the user may be located.

SIP is a request-response protocol, dealing with requests from clients and responses from servers. Participants are identified by SIP Uniform Resource Locators (URL's). Requests can be sent through any transport protocol, such as User Datagram Protocol (UDP), Stream Control Transmission Protocol (SCTP), or Transmission Control Protocol (TCP). SIP determines the end system to be used for the session, the communication media and media parameters, and the called party's desire to engage in the communication. Once these parameters are assured, SIP establishes call parameters at either end of the communication, and handles call transfer and termination.

The SIP server 198 can receive SIP invites from mobile communications devices such as mobile communications device 185. Responsive to receiving such an invite, the SIP server 198 can determine which gateway has an affinity with the requesting mobile communications device 185 or subscriber. For example, mobile communications device 185 can have an affinity with mobile network 125 and gateway 190. If the SIP server 198 receives an invite from mobile communications device 185, the SIP server 198 can determine that the mobile communications device 185 has an affinity with gateway 190.

In one embodiment of the present invention, the SIP server 198 can be configured as a SIP proxy server. In that case, the SIP proxy server can utilize standard SIP look-up and directory schemas to identify the particular gateway having an affinity with the requester. In another embodiment of the present invention, the SIP server 198 can be implemented as a SIP redirect server. In that case, the SIP redirect server can respond to the requester with the network location, for example an address, of the gateway with which the requesting device has an affinity. Accordingly, the mobile communication device 185, upon receiving the response from the SIP redirect server, can communicate directly with that gateway.

The mobile communications device 185 can be configured to communicate over at least one of the mobile networks 125, 145, and/or 155 as well as the wireless network 105. The mobile communications device 185 can include transceivers for communicating over both mobile networks and wireless networks. Further, the mobile communications device 185 can be configured to measure the power of signals received from each network and vary the transmission strength of signals sent to each respective network. In addition, the mobile communications device 185 also can include a SIP user agent executing therein. The SIP user agent can encode and decode SIP formatted messages which are exchanged over the wireless network 105. In one embodiment of the present invention, the mobile communications device 185 can be implemented as a mobile phone. Still, those skilled in the art will recognize that any communications device configured as described herein can be used.

Figure 2:
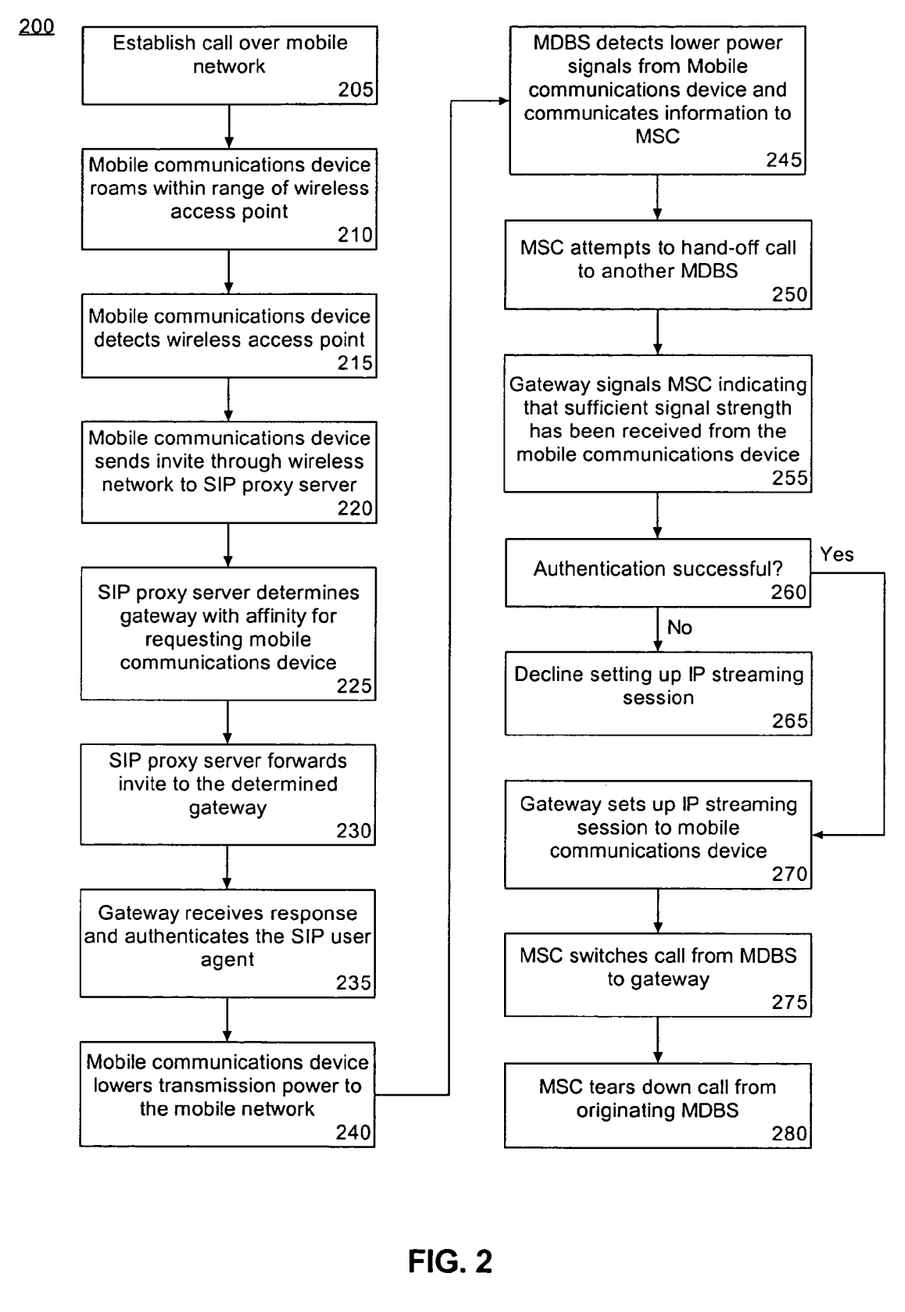
FIG. 2 is a flow chart illustrating a method of roaming between a mobile communications network and a wireless communications network in accordance with one aspect of the present invention.

FIG. 2 is a flow chart illustrating a method 200 of roaming between a mobile network and a wireless network in accordance with one embodiment of the present invention. The method 200 can be performed using the system of FIG. 1, wherein the SIP server is configured as a SIP proxy server. Accordingly, the method 200 can begin in a state where a user has a mobile communications device that is configured to communicate over mobile networks and an 802.11 compliant wireless network. Further, the mobile communications device can include a SIP user agent executing therein.

The method 200 can begin in step 205 where a user activates the mobile communications device and establishes a call over a mobile network. Once the call is established, in step 210, the user and mobile communications device can roam within range of an 802.11 compliant wireless access point. In step 215, the mobile communications device can detect the wireless access point and, in step 220, send an invite to the SIP proxy server. The invite can be a SIP invite that is sent over a wireless communications link to the wireless access point. The wireless access point forwards the invite to the SIP proxy server via the Internet or another packet-switched network.

In step 225, the SIP proxy server determines the gateway with which the requesting mobile communications device has an affinity. More particularly, the SIP proxy server determines the gateway having an affinity with the user agent disposed within the mobile communications device that issued the SIP invite. In step 230, the SIP proxy server can forward the received invite to the gateway determined in step 225.

In step 235, the selected gateway receives the SIP invite from the SIP proxy server and authenticates the SIP user agent executing within the mobile communications device.

In step 240, the mobile communications device can lower the transmission power used to transmit to the mobile network.

For example, in one embodiment of the present invention, the mobile communications device can be configured to compare the strength or power of detected signals from both the mobile network and the wireless network. Accordingly, if the signal strength detected from the wireless network exceeds the signal strength detected from the mobile network, the mobile communications device can be configured to lower the power used to transmit to the mobile network, or otherwise attenuate signals being sent to the mobile network. If not, the mobile communications device need not transmit signals at reduced power to the mobile network, or otherwise attenuate signals sent to the mobile network. In that case, the call can continue over the mobile network.

In step 245, the MDBS detects and measures the weakened signals being transmitted from the mobile communications device. The MDBS can communicate this information to the MSC. In step 250, having received information regarding the weakened signals received from the mobile communications device in the MDBS, the MSC attempts to hand-off the call to another MDBS. It should be appreciated that the mobile communications device can be configured or programmed to reduce transmission power to the mobile network or attenuate signals sent to the mobile network to a predetermined level such that, when the weakened signals from the mobile communications device are detected by the mobile network, a hand-off condition in the MSC is triggered. That is, the MSC can initiate a hand-off when the power of signals received from the mobile communications device is measured to be less than a threshold level. The MSC also can be configured to notify the gateway of any detected hand-off conditions.

In step 255, the gateway signals the MSC using a standard communications protocol, for example Standard IS-41, that the gateway has received a signal having a minimum power or strength from the mobile communications device. For instance, the access point can detect the strength of the signal received from the mobile communications device and provide that information to the gateway.

In step 260, the gateway can determine whether authentication of the SIP user agent in the mobile communications device was successful. If not, the method can proceed to step 265 where the gateway declines setting up an Internet Protocol (IP) streaming session with the mobile communications device. In that case, the method can end and the call can remain with the mobile network. If the SIP user agent is successfully authenticated, the method can proceed to step 270.

In step 270, the gateway sets up an IP streaming session with the mobile communications device via the wireless access point using standard streaming protocols such as Real Time Protocol (RTP). In step 275, the MSC switches the call from the MDBS to the gateway. After completion of step 275, the leg or portion of the call involving the mobile communications device is conducted over the 802.11 wireless network. Depending upon the location of the other call participant, other legs of the call can be conducted over the Internet as an IP-based call, the PSTN as a conventional call, the mobile network as a mobile call, or another wireless network conforming with one of the 802.11 communications protocols. In step 280, the MSC can tear down the call originating from the MDBS.

Figure 3:
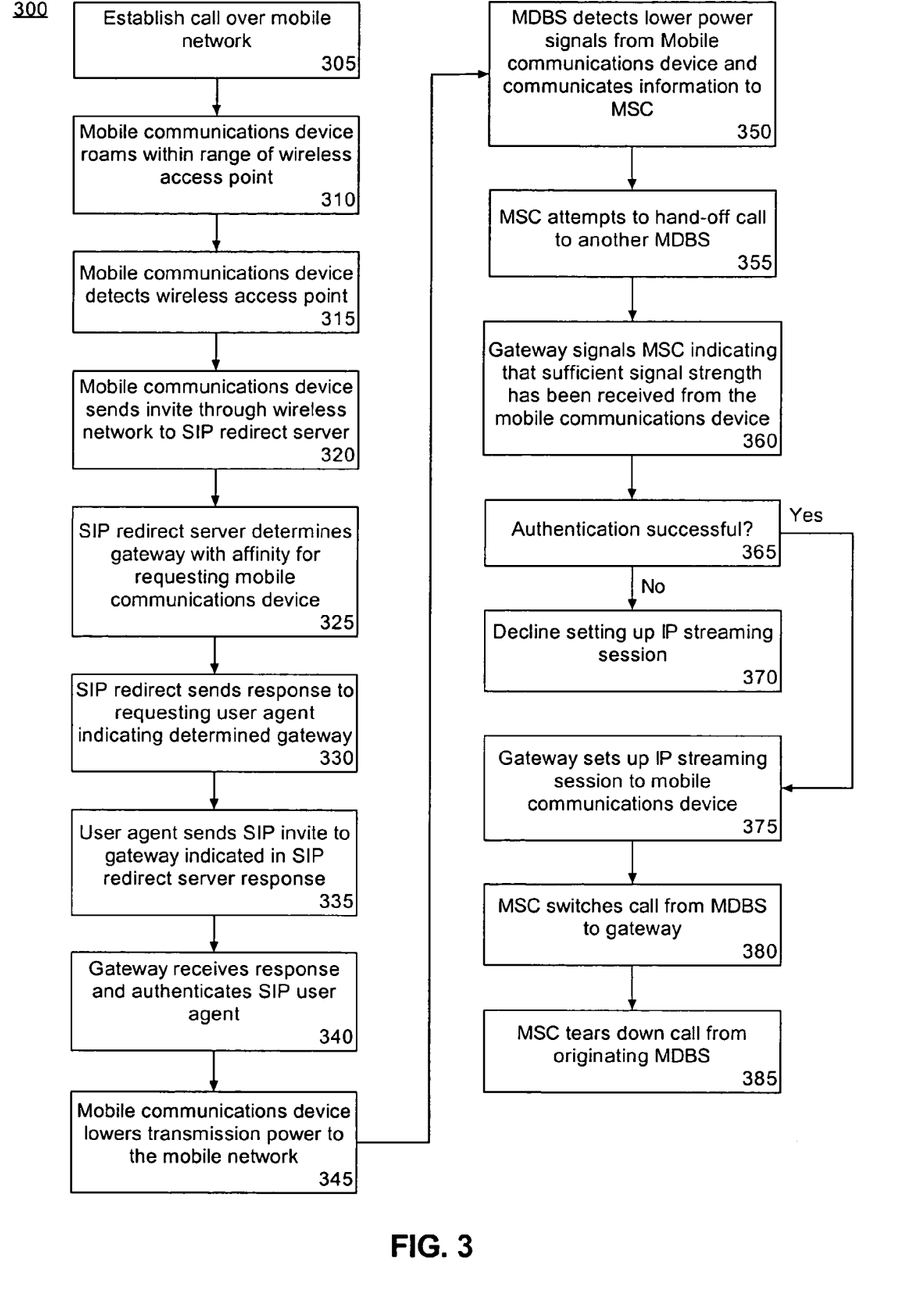
FIG. 3 is a flow chart illustrating a method of roaming between a mobile communications network and a wireless communications network in accordance with another aspect of the present invention.

FIG. 3 is a flow chart illustrating a method 300 of roaming between a mobile network and a wireless network in accordance with another embodiment of the present invention. The method 300 is substantially similar to that of FIG. 2, with the exception that the system implementation includes a SIP redirect server rather than a SIP proxy server. Like method 200, method 300 can begin in a state where a user has a mobile communications device that is configured to communicate over mobile networks and an 802.11 compliant wireless network. Further, the mobile communications device can include a SIP user agent executing therein.

The method 300 can begin in step 305 where a user activates the mobile communications device and establishes a call over a mobile network. Once the call is established, in step 310, the user and mobile communications device can roam within range of an 802.11 compliant wireless access point. In step 315, the mobile communications device can detect the wireless access point and, in step 320, send a SIP invite to the SIP redirect server via a wireless communications link with the wireless access point. The wireless access point forwards the invite to the SIP redirect server via the Internet or another packet-switched network.

In step 325, the SIP redirect server determines the gateway with which the requesting mobile communications device has an affinity. More particularly, the SIP redirect server determines an address for the gateway having an affinity with the user agent disposed within the mobile communications device that issued the SIP invite. In step 330, the SIP redirect server sends a response to the requesting user agent. The response specifies the address of the determined gateway.

In step 335, mobile communications device can send a SIP invite to the gateway indicated by the response received from the SIP redirect server. More particularly, the user agent disposed within the mobile communications device can send the SIP invite to the specified address. In step 340, the selected gateway receives the SIP invite from the SIP proxy server and authenticates the SIP user agent executing within the mobile communications device. In step 345, the mobile communications device can lower the transmission power used to transmit to the mobile network.

As noted, the mobile communications device can be configured to compare the strength or power of detected signals from both the mobile network and the wireless network. If the signal strength detected from the wireless network exceeds the signal strength detected from the mobile network, the mobile communications device can be configured to lower the power used to transmit to the mobile network, or otherwise attenuate signals being sent to the mobile network. If not, the mobile communications device need not transmit signals at reduced power to the mobile network, or otherwise attenuate signals sent to the mobile network. Accordingly, the call can continue over the mobile network.

In step 350, the MDBS detects and measures the weakened signals being transmitted from the mobile communications device. The MDBS can communicate this information to the MSC. In step 355, having received information regarding the weakened signals received from the mobile communications device in the MDBS, the MSC attempts to hand-off the call to another MDBS. It should be appreciated that the mobile communications device can be configured or programmed to reduce transmission power to the mobile network or attenuate signals sent to the mobile network to a predetermined level such that when the weakened signals from the mobile communications device are detected by the mobile network a hand-off condition in the MSC is triggered. That is, the MSC can initiate a hand-off when the power of signals received from the mobile communications device is measured to be less than a threshold level. The MSC also can be configured to notify the gateway of any detected hand-off conditions.

In step 360, the gateway signals the MSC using a standard communications protocol, for example Standard IS-41, that the gateway has received a signal having a minimum power or strength from the mobile communications device. For instance, the access point can detect the strength of the signal received from the mobile communications device and provide that information to the gateway.

In step 365, the gateway can determine whether authentication of the SIP user agent in the mobile communications device was successful. If not, the method can proceed to step 370 where the gateway declines setting up an IP streaming session with the mobile communications device. In that case, the method can end and the call can remain with the mobile network. If the SIP user agent is successfully authenticated, the method can proceed to step 375.

In step 375, the gateway sets up an IP streaming session with the mobile communications device via the wireless access point using standard streaming protocols. In step 380, the MSC switches the call from the MDBS to the gateway. After completion of step 380, the leg or portion of the call involving the mobile communications device and user is conducted over the 802.11 wireless network. Depending upon the location of the other call participant, other legs of the call can be conducted over the Internet as an IP-based call, the PSTN as a conventional call, the mobile network as a mobile call, or another wireless network conforming with one of the 802.11 communications protocols. In step 385, the MSC can tear down the call originating from the MDBS.

The methods described herein with reference to FIGS. 2 and 3 have been provided for purposes of illustration only. As such, it should be appreciated that particular steps can be performed in varying order without departing from the spirit or essential attributes of the present invention.

The present invention provides a solution that allows mobile communications device users to roam freely between mobile networks and 802.11 wireless networks. The embodiments disclosed herein support both voice and data communications between mobile and wireless networks. As such, mobile users can continue to access both voice and data services whether in proximity to a mobile network or a wireless network as described herein.

The present invention can be realized in hardware, software, or a combination of hardware and software. Aspects of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Aspects of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of roaming between a mobile network and a wireless network comprising the steps of:
    receiving, over the wireless network, an invite from a user agent disposed within a mobile communications device, wherein the mobile communications device is engaged in a call over a voice channel in the mobile network;
    selecting one of a plurality of gateways having an affinity with the user agent, wherein each gateway is an interface between at least one mobile network and the wireless network, and wherein the step of selecting one of the plurality of gateways comprises determining a network location of the selected gateway; and
    handing off the call from the mobile network so that at least a portion of the call is conducted over the wireless network using the selected gateway, wherein the step of handing off the call comprises sending a reply to the user agent via the wireless network, the reply specifing the network location of the gateway selected.

2. The method of claim 1, wherein said handing off step comprises routing the invite to the selected gateway.

3. The method of claim 1, wherein a streaming session is set up between the gateway and the mobile communications device, said handing off step comprising conducting at least a portion of the call over the streaming session.

4. The method of claim 1, wherein the mobile communications device sends an invite to the selected gateway thereby initiating a streaming session between the gateway and the mobile communications device over which at least a portion of the call is conducted.

5. The method of claim 1, wherein the wireless network is configured according to at least one of the 802.11 communications protocols.

6. The method of claim 1, wherein the invite is formatted using Session Initiation Protocol.

7. The method of claim 1, further comprising the step of tearing down the voice channel in the mobile network.

8. Within a mobile communications device, a method of roaming between a mobile network and a wireless network comprising the steps of:
    engaging in a call conducted over a voice channel in the mobile network; and sending, over the wireless network, an invite to a Session Initiation Protocol server, wherein the Session Initiation Protocol server selects a mobile-wireless network gateway having an affinity with the mobile communications device, wherein the call is handed off so that at least a portion of the call is conducted over the wireless network using the selected mobile-wireless network gateway;
    wherein the sending step comprises (a) receiving a reply via the wireless network, the reply specifying a network location of the selected mobile-wireless network gateway, and (b) sending an invite to the selected mobile-wireless network gateway, the selected mobile-wireless network gateway initiating a streaming session with the mobile communications device over the wireless network, such that at least a portion of the call is conducted over the streaming session.

9. The method of claim 8, wherein a streaming session is set up between the mobile-wireless gateway and the mobile communications device, wherein at least a portion of the call is conducted over the streaming session.

10. The method of claim 8, wherein the wireless network is configured according to at least one of the 802.11 communications protocols.

11. The method of claim 8, further comprising the step of tearing down the voice channel in the mobile network.

12. A system for roaming between a mobile network and a wireless network comprising:
   a wireless network comprising an access point configured to wirelessly communicate with devices and facilitate communications over a packet-switched network;
   a plurality of gateways, each configured as an interface between the packet-switched network and at least one mobile network;
   a Session Initiation Protocol server configured to determine which one of the plurality of gateways having an affinity with a mobile communications device, said Session Initiation Protocol server being a Session Initiation Protocol proxy server configured to determine affinities between the mobile communications device and gateways, and to route invites received over the wireless network from the mobile communications device to the gateway having an affinity with the mobile communications device; and
   at least one mobile network comprising a mobile data base station configured to communicate with a mobile communications device over a mobile voice channel of the mobile network and a mobile switching center configured to route mobile calls and link said mobile data base station with said one of said plurality of gateways;
   wherein said one of said plurality of gateways, as determined by said Session Initiation Protocol server, and said mobile switching center work cooperatively to hand-off calls between the mobile network and the wireless network.

13. The system of claim 12, wherein the Session Initiation Protocol server is a Session Initiation Protocol redirect server configured to determine affinities between the mobile communications device and gateways, and reply to invites from the mobile communications device wherein the reply specifies a network location of the gateway having an affinity with the mobile communications device.

14. The system of claim 13, wherein the mobile communications device sends an invite over the wireless network to the gateway determined by the Session Initiation Protocol redirect server.

15. A system for roaming between a mobile network and a wireless network comprising:
   means for receiving, over the wireless network, an invite from a user agent disposed within a mobile communications device, wherein the mobile communications device is engaged in a call over a voice channel in the mobile network;
   means for selecting one of a plurality of gateways having an affinity with the user agent, wherein each gateway is an interface between at least one mobile network and the wireless network, wherein said means for selecting determines a network location of the selected gateway; and
   means for handing off the call from the mobile network so that at least a portion of the call is conducted over the wireless network using the selected gateway, wherein said means for handing off comprises means for sending a reply to the user agent via the wireless network, the reply specifying the network location of the selected gateway.

16. The system of claim 15, wherein said means for handing off comprises means for routing the invite to the selected gateway.

17. The system of claim 15, wherein a streaming session is set up between the gateway and the mobile communications device, said means for handing off further comprising means for conducting at least a portion of the call over the streaming session.

18. The system of claim 15, wherein the mobile communications device sends an invite to the selected gateway thereby initiating a streaming session between the gateway and the mobile communications device over which at least a portion of the call is conducted.

19. The system of claim 15, wherein the wireless network is configured according to at least one of the 802.11 communications protocols.

20. The system of claim 15, wherein the invite is formatted using Session Initiation Protocol.

21. The system of claim 15, further comprising means for tearing down the voice channel in the mobile network.

22. A mobile communications device configured to roaming between a mobile network and a wireless network comprising:
   means for engaging in a call conducted over a voice channel in the mobile network; and
   means for sending, over the wireless network, an invite to a Session Initiation Protocol server, wherein the Session Initiation Protocol sewer selects a mobile-wireless network gateway having an affinity with the mobile communications device, wherein the call is handed off so that at least a portion of the call is conducted over the wireless network using the selected mobile-wireless network gateway, and wherein said means for sending further comprises means for receiving a reply via the wireless network, the reply specifying a network location of the selected mobile-wireless network gateway, and means for sending an invite to the selected mobile-wireless network gateway, the selected mobile-wireless network gateway initiating a streaming session with the mobile communications device over the wireless network, and at least a portion of the call being conducted over the streaming session.

23. The system of claim 22, wherein a streaming session is set up between the mobile-wireless gateway and the mobile communications device, wherein at least a portion of the call is conducted over the streaming session.

24. The system claim 22, wherein the wireless network is configured according to at least one of the 802.11 communications protocols.

25. A machine readable storage, having stored thereon a computer program having a plurality of code sections executable by a machine for causing the machine to perform the steps of:
   receiving, over a wireless network, an invite from a user agent disposed within a mobile communications device, wherein the mobile communications device is engaged in a call over a voice channel in the mobile network;
   selecting one of a plurality of gateways having an affinity with the user agent, wherein each gateway is an interface between at least one mobile network and the wireless network, wherein the selecting step comprises determining network location of the selected gateway; and handing off the call from the mobile network so that at least a portion of the call is conducted over the wireless network using the selected gateway, wherein the handing off step comprises sending a reply to the user agent via the wireless network, wherein the reply specifies the network location of the selected gateway.

26. The machine readable storage of claim 25, wherein said handing off step comprises routing the invite to the selected gateway.

27. The machine readable storage of claim 25, wherein a streaming session is set up between the gateway and the mobile communications device, said handing off step comprising conducting at least a portion of the call over the streaming session.

28. The machine readable storage of claim 25 wherein the mobile communications device sends an invite to the selected gateway thereby initiating a streaming session between the gateway and the mobile communications device over which at least a portion of the call is conducted.

29. The machine readable storage of claim 25, wherein the wireless network is configured according to at least one of the 802.11 communications protocols.

30. The machine readable storage of claim 25, wherein the invite is formatted using Session Initiation Protocol.

31. The machine readable storage of claim 25, further comprising the step of tearing down the voice channel in the mobile network.

32. A machine readable storage, having stored thereon a computer program having a plurality of code sections executable by a machine for causing the machine to perform the steps of:

engaging in a call conducted over a voice channel in a mobile network; and sending, over the wireless network, an invite to a Session Initiation Protocol server, wherein the Session Initiation Protocol server selects a mobile-wireless network gateway having an affinity with the mobile communications device, wherein the call is handed off so that at least a portion of the call is conducted over a wireless network using the selected mobile-wireless network gateway;

wherein the sending step comprises receiving a reply via the wireless network, the reply specifying a network location of the selected mobile-wireless network gateway; and sending an invite to the selected mobile-wireless network gateway, the selected mobile-wireless network gateway initiating a streaming session with the mobile communications device over the wireless network, and at least a portion of the call being conducted over the streaming session.

33. The machine readable storage of claim 32, wherein a streaming session is set up between the mobile-wireless gateway and the mobile communications device, wherein at least a portion of the call is conducted over the streaming session.

34. The machine readable storage of claim 32, wherein the wireless network is configured according to at least one of the 802.11 communications protocols.

35. The machine readable storage of claim 32, further comprising the step of tearing down the voice channel in the mobile network.

* * * * *